Figure 1:
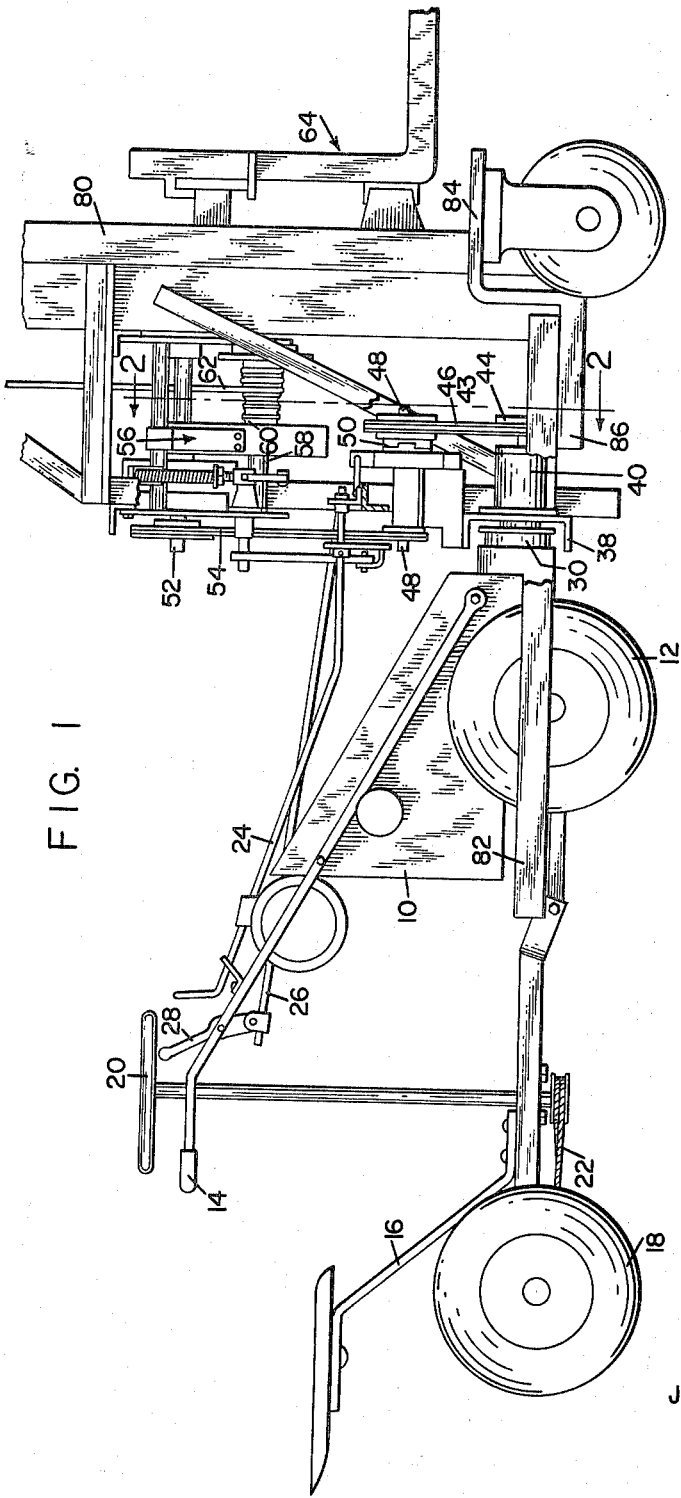

Sept. 7, 1965  J. H. SAGARIAN  3,204,724
FORK LIFT ATTACHMENT FOR SMALL TRACTORS
Filed Feb. 21, 1964  3 Sheets-Sheet 1

INVENTOR
JOHN H. SAGARIAN

BY *Charles R. Fay*
ATTORNEY

Sept. 7, 1965 J. H. SAGARIAN 3,204,724
FORK LIFT ATTACHMENT FOR SMALL TRACTORS
Filed Feb. 21, 1964 3 Sheets-Sheet 2
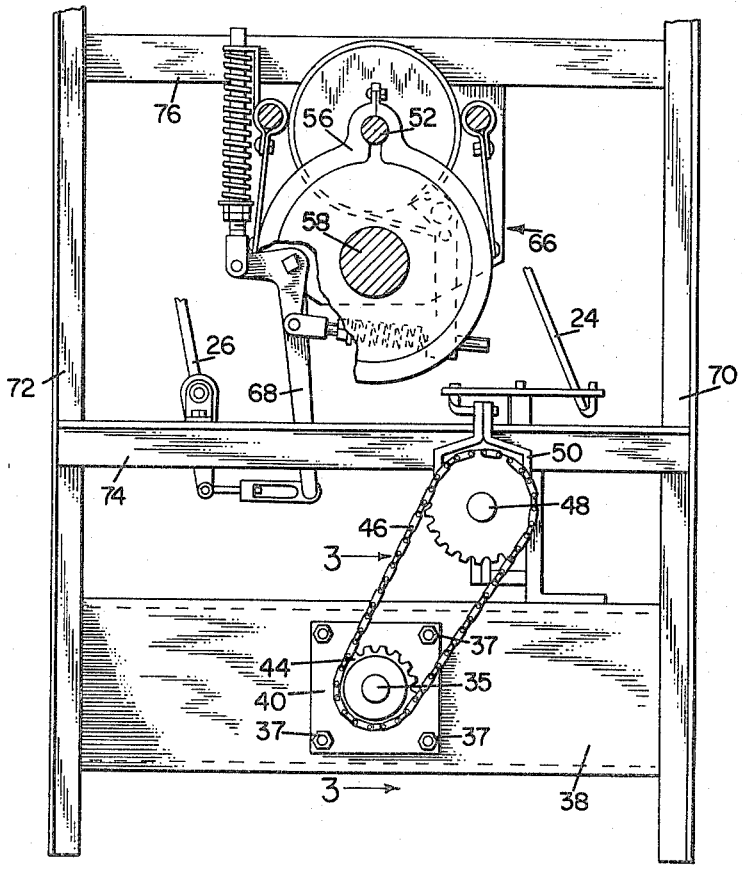
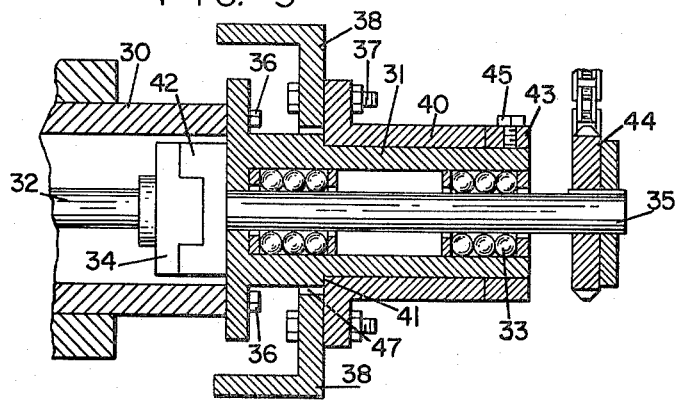
INVENTOR
JOHN H. SAGARIAN
BY *Charles P. Fay*
ATTORNEY Sept. 7, 1965      J. H. SAGARIAN      3,204,724
FORK LIFT ATTACHMENT FOR SMALL TRACTORS
Filed Feb. 21, 1964      3 Sheets-Sheet 3
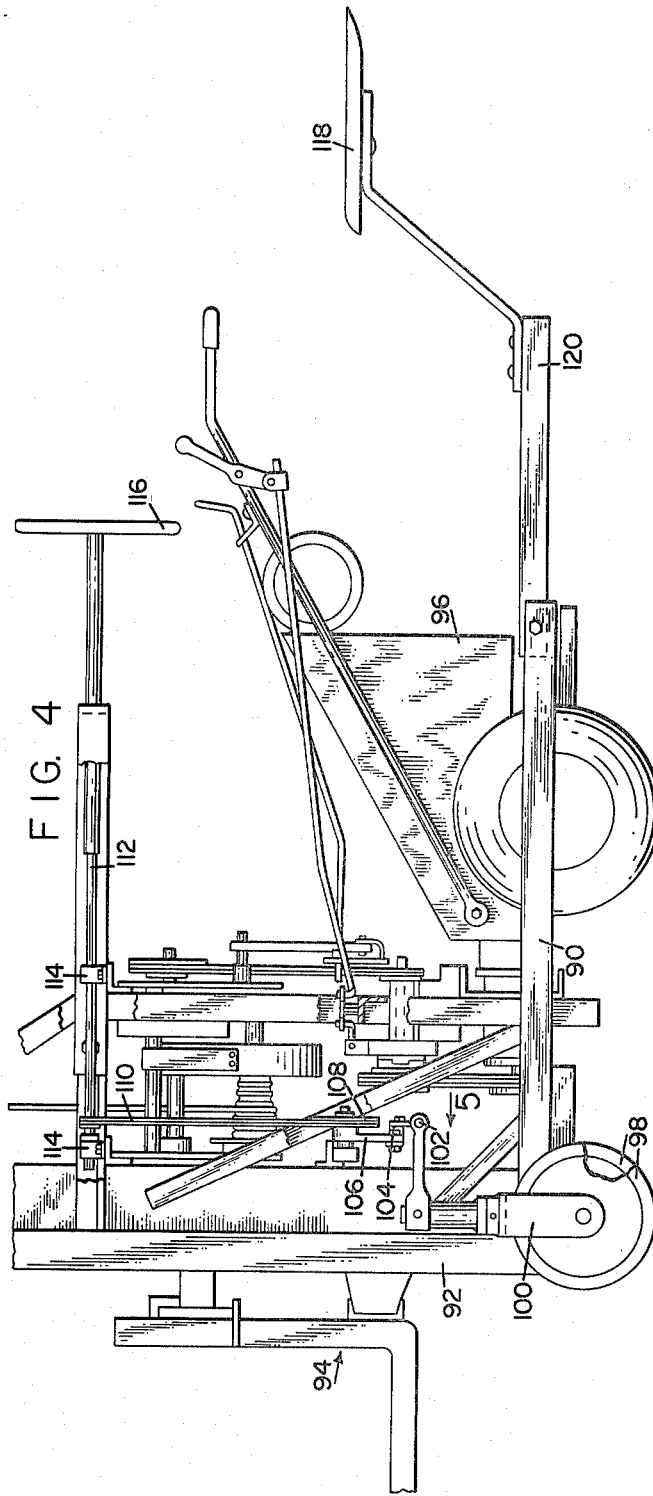
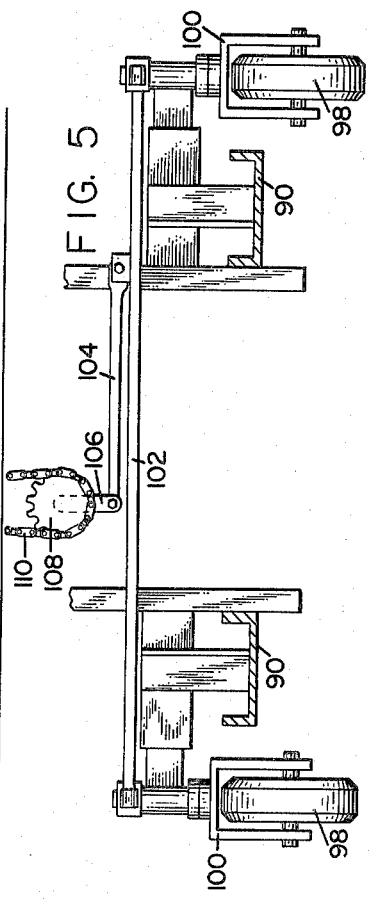
INVENTOR
JOHN H. SAGARIAN
BY *Charles R. Jay*
ATTORNEY

United States Patent Office 3,204,724
Patented Sept. 7, 1965

3,204,724
FORK LIFT ATTACHMENT FOR SMALL TRACTORS
John H. Sagarian, 43 Chandler St., Worcester, Mass.
Filed Feb. 21, 1964, Ser. No. 346,466
7 Claims. (Cl. 187—9)

This invention relates to an attachment for tractors and relates particularly to a fork lift device which is very quickly and easily attached to a tractor to be energized thereby not only for operating the lift but also for providing for transportation of the lift by means of the tractor engine.

One of the principal objects of the invention resides in the provision of a fork lift which is completely self-contained and which is quickly and easily applied to and detached from the tractor so that the latter can be used for other purposes without much time being expended in disconnecting the lift attachment. To this end the fork lift attachment comprises a self-contained unit including a relatively upright framework with wheels thereon to support it and a new and improved drive connection to the usual power takeoff of the tractor, the lift framework being secured to the tractor merely by a few fasteners such as bolts, so that the tractor can be driven up to the stationary, unattached fork lift framework, the usual takeoff shaft from the tractor being arranged in driving position with relation to the lift driving mechanism, and by means of the few fasteners or bolts above recited, the attachment is securely mounted on the tractor which can then be used to transport the lift framework, the lift being controlled from the driver's position by simply attached control means for remote control operation of the fork lift attachment.

Another object of the invention resides in the provision of a modification in which the tractor may be furnished without a seat and the control operation may be made from a standing position, this modification of the device providing improved steering means for the wheels supporting the fork lift truck itself so as to provide for steering it.

Other objects and advantages of the invention will appear hereinafter.

Reference is to be had to the accompanying drawings, in which:

FIG. 1 is a view in elevation illustrating the invention;
FIG. 2 is a sectional view on line 2—2 of FIG. 1 on an enlarged scale;
FIG. 3 is a sectional view on an enlarged scale on the line 3—3 of FIG. 2;
FIG. 4 is a view in elevation showing a modification, and
FIG. 5 is a section on line 5—5 of FIG. 4.

Referring now to FIG. 1 there is here shown indicated by reference numeral 10 the general representation of a self-propelled tractor which can be of any well known commercial type. This tractor is provided with an engine properly mounted, housed, etc. and a pair of drive wheels 12. Such a tractor may be provided with a three or four wheel frame if desired including a seat for the operator as is well known but in the present case the device is illustrated as a hand-guided apparatus which can if desired be steered by handle bars or the like 14. On the other hand a sulky generally indicated at 16 may be utilized and hitched to the device in the usual manner as by a swivel or the like, and in the present case the dirigible wheels 18 can be steered through a hand wheel 20 and appropriate gearing 22.

The tractor preferably is provided with various control members as is usual which can be provided with handles adjacent the handle bar 14 or wheel 20 for the control of the vehicle. Thus, in FIG. 1 the reference numeral 24 indicates a clutch control rod and numeral 26 indicates a brake control rod which can be operated by a handle 28 mounted intermediate its ends as shown in FIG. 1. The purpose and operation of these control rods will be described hereinafter but in general it is pointed out that tractors of the nature described are conveniently provided with various like kinds of controls, and appliances such as starters, etc.

In the present case the main drive shaft of the tractor extends into an advance casting indicated at 30, it being understood that there is the usual drive shaft and clutch in this casting as is perhaps better shown in FIG. 3, the drive shaft being shown at 32 and the clutch at 34, this clutch being utilizes to operate the lift as will be hereinafter described. The forward face of the advance casting is substantially square and is provided with a series of four bolts 36 which are utilized to secure an extending hollow member 31 in which are provided a series of bearings 33. The bearings mount a shaft 35 provided with a clutch face 42 so that the shaft is driven from the clutch part 34. There is a transverse channel-iron or the like 38 which is bolted at 37 to a flange on the member 40 which surrounds member 31. Member 40 is located between a shoulder at 41 on member 31 and a collar 43 which can be secured to the member 31 by a setscrew or the like 45. By this arrangement there may be provided a relative motion between the fork lift and the tractor so that if one of the units hits a bump it will not lift the other unit out of contact with the ground. To disconnect the fork lift from the tractor all that is necessary to do is to remove bolts 36 and pull the tractor away from the fork lift. The member 31 extends through the channel iron 38 which is provided with a hole 47 for this purpose. This drives the pulley, sprocket or the like 44 which in turn drives a belt or chain 46 driving a jack shaft 48 by means of a conventional clutch 50 operated by the clutch control rod 24 which is disconnectable.

Thereby it is seen that the jack shaft 48 is under the control of the operator and it in turn drives a parallel shaft 52 by means of a belt or a chain 54 connected through appropriate gearing in a housing 56 to drive a shaft 58. Shaft 58 has fixed thereto a cable pulley 60 for running a cable 62 in either of two directions, cable 62 being connected by means (not shown) directly to the fork lift generally indicated at 64 and raising and lowering the same, all under the control of the operator, i.e. by clutch 24. It is to be understood that this operation can be performed whether the tractor is driving wheels 12 or not, as other clutch control means for these wheels are of course mounted in the tractor apparatus as usual.

The brake rod 26 is connected to operate a commercial type of brake apparatus which is generally indicated by the reference numeral 66 through a series of links 68 forming no part of the present invention but being useful to brake the descent of the fork lift near the end of its travel and to hold it at different positions of elevation as may be desired, particularly in its uppermost position.

The foregoing described mechanism including the shaft 40, the driving mechanism 44, 48, 52, 56, etc. are all conveniently mounted on an upright framework which is shown in FIG. 2. This framework includes as an important part thereof the cross channel 38 and a boxlike frame comprising the uprights 70, 72, cross pieces 74, 76, and such other uprights and cross pieces as may be found necessary to support the mechanism and particularly with respect to heavy upright members 80 upon which the fork lift 68 is adapted to slide. The mechanism for actually operating and braking the lift is conventional but its arrangement is appropriately and conveniently disposed upon the framework described in a manner so as to provide for operation of the fork lift from the tractor. The members 80 are part of the fork lift construction.

More important, the entire framework described including the fork lift and its driving means is supported upon a horizontal framework which is generally indicated by the reference numeral 82 in FIG. 1. This is a heavy frame which is secured to the frame 84 supporting the fork lift as for instance at 86 in FIG. 1. Frame 82 can conveniently comprise a series of channel-irons or I-beams and they preferably extend about the entire tractor and sulky arrangement, providing an extremely strong and heavy base for the fork lift, it being understood that the fork itself at 64 is a heavy apparatus.

However, there must be provided an opening in the frame in order to drive the tractor into the position shown in FIG. 1 and to back it out, and to this end as shown in FIG. 1 the frame 82 terminates just to the right-hand side of the tractor 10, and as a matter of fact it can be left permanently open at this rear area if desired. The point is that upon removing the four bolts 36 and lifting off the control rods 24 and 26, the tractor is freely removable and may be used for such other uses as may be desired. If the framework 82 completely surrounds the tractor, it is merely necessary to open the rear part as by lifting a back member off, etc. in order to completely free the tractor.

In order to more clearly understand the invention it may be pointed out that the representation of the tractor shown is similar to that manufactured by Gravely Tractors, Dunbar, West Virginia.

Now referring to FIG. 4 there is shown a modification of the invention. In this case the main horizontal frame of the fork lift arrangement is indicated by the reference numeral 90 and it is similar to that previously described, together with the uprights 92 which actually support the fork lift 94. The tractor is shown in general at 94 and the sulky arrangement at 98. The sulky may or may not be used as desired.

All of the other parts are the same as before described and it is not believed necessary to redescribe the fork lift raising and lowering apparatus, the brake mechanism, etc.

The main difference between the FIG. 1 and the FIG. 4 construction is that in the FIG. 4 construction there is a self-contained steering apparatus for the fork lift which also of course will steer the tractor when connected so that the wheel 20 can be dispensed with. This includes a pair of dirigible wheels 98, one on each side of the frame 90. These can be mounted as for instance in horns or casters 100 mounted to turn under influence of the transverse link 102 which can be traversed in a horizontal plane to oscillate the casters under influence of the link 104, see FIG. 5. Link 104 is connected to an arm 106 oscillatable on a horizontal fore-and-aft axis under influence of a wheel 108 which is fixed to it. The wheel 108 is in turn oscillated through a belt or chain 110, trained over a rod 112 mounted in bearings 114 on the framework of the fork lift. The rod 112 can be turned from the operator's position by the wheel 116 fast to the shaft 112. If desired, the seat 118 can be mounted on members 120 attached to the members 90. In this case the device will be traveled by the engine of the tractor as before.

Having thus described my invention and the advantages thereof, I do not wish to be limited to the details herein disclosed, otherwise than as set forth in the claims, but what I claim is:

1. The combination of a separable attachment for a tractor in which the tractor has a frame, an engine, a power takeoff shaft and clutch therefor, together with a clutch control rod and a brake control rod, wherein said attachment comprises a generally upright frame, a lift on the frame, means for traveling the lift up and down on the frame, brake means therefor, a clutch part on the frame for connection with the clutch of the tractor, means to brake the lift traveling means, means connecting the brake for operation by the brake control rod, means supporting the lift and its frame on the ground, the lift frame and the tractor being relatively movable to a position aligning the takeoff shaft clutch of the tractor with the clutch part on the lift frame to energize the lift traveling means, and connecting means comprising a plurality of easily operable fasteners for securing the lift frame to the tractor, said fasteners being located adjacent the takeoff shaft.

2. The combination of claim 1 wherein said fasteners are bolts located about said power takeoff shaft.

3. The combination of a separable attachment for a tractor in which the tractor has a frame, an engine, a power takeoff shaft and clutch therefor, together with a clutch control rod and a brake control rod, wherein said attachment comprises a generally upright frame, a lift on the frame, means for traveling the lift up and down on the frame, brake means therefor, a clutch part on the frame for connection with the clutch of the tractor, means to brake the lift traveling means, means connecting the brake for operation by the brake control rod, means supporting the lift and its frame on the ground, the lift frame and the tractor being relatively movable to a position aligning the takeoff shaft clutch of the tractor with the clutch part on the lift frame to energize the lift traveling means, said tractor frame including a part adjacent the takeoff shaft coinciding with a part of the lift frame for connecting the lift frame to the tractor frame, and means for securing said parts together.

4. The combination of claim 3 wherein said lift frame supporting means comprises dirigible wheels.

5. The combination of claim 3 wherein said lift frame supporting means comprises dirigible wheels, and means for steering said dirigible wheels adjacent the brake and clutch control means.

6. The combination of claim 3 including an articulated seat connected to the tractor frame, wheels on said articulated seat, and means adjacent the seat for steering the wheels.

7. The combination of claim 1 wherein the lift frame includes horizontal members extending along the sides of the tractor.

No references cited.

SAMUEL F. COLEMAN, *Primary Examiner.*